UNITED STATES PATENT OFFICE.

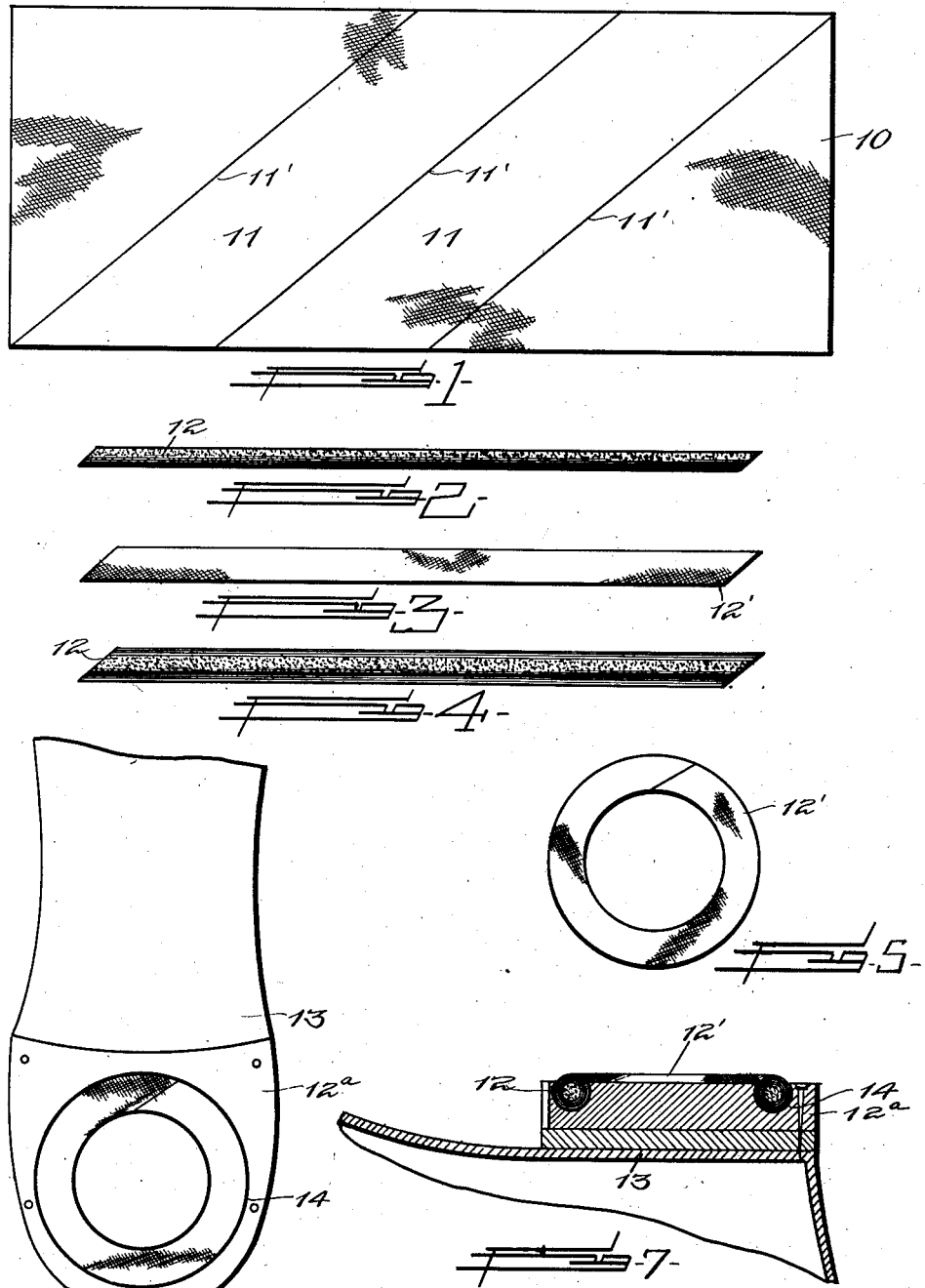

FRANK L. KRYDER, OF AKRON, OHIO.

ANTISKID MEANS FOR SHOES.

1,097,239.

Specification of Letters Patent. Patented May 19, 1914.

Application filed July 19, 1913. Serial No. 779,891.

*To all whom it may concern:*

Be it known that I, FRANK L. KRYDER, a citizen of the United States, residing at Akron, in the county of Summit and State of Ohio, have invented certain new and useful Improvements in Antiskid Means for Shoes, of which the following is a specification.

My invention relates to improvements in heels or soles of shoes, boots or the like, and has particular reference to means of this character which will be highly shock absorbing and anti-slipping or skidding.

An important object of my invention is to provide means to be used in connection with a rubber heel or sole, to save the same from wear and at the same time increasing its elasticity and gripping power.

A further object of the invention is to provide means of the above mentioned character, which is simple in construction, strong, durable and cheap to manufacture.

Other objects and advantages of this invention will be apparent during the course of the following description.

In the accompanying drawings forming a part of this specification and in which like numerals are employed to designate like parts throughout the same, Figure 1 is a plan view of a section of fabric employed in the construction of the invention, Fig. 2 is a side elevation of a core of a suction element, Fig. 3 is a similar view of the suction element complete before it is bent into circular form, Fig. 4 is a central longitudinal sectional view through the same, Fig. 5 is a plan view of the same after being bent in a circular form, Fig. 6 is a plan view of the same applied to a heel, and, Fig. 7 is a longitudinal sectional view through the heel with the suction element attached thereto.

In the preferred manufacture of my invention, I take a section of fabric 10 which is preferably formed of coarsely woven duck, canvas, or some other strong open fabric, having one or both faces, preferably both, coated with rubber having mixed therewith some non-slipping or skidding material, such as gravel or the like, and cut the same diagonally or on the bias along lines 11', forming strips 11. I employ a preferably cylindrical highly elastic core 12, which may be formed of sponge rubber or the like, the same having its ends cut on an angle, to fit, when bent in a circular form. Upon this highly elastic core, when the same is straight, I spirally wind the coated fabric strips 11, layer upon layer, until a cylindrical suction element or structure 12' is obtained, having the desired diameter. The previously straight suction element 12' is now bent in the form of a ring, as shown. The annular suction element is next immersed in or coated with plastic rubber or any other suitable vulcanizing cement.

As shown in Figs. 6 and 7, the numeral 12$^a$ designates a rubber heel (while the invention is equally applicable to a leather heel or a rubber or leather sole), secured to the sole 13 in any well known or preferred manner. This rubber heel is provided upon its tread surface with an annular groove 14, which is a little more than semi-circular in cross-section. The annular suction element is now placed within the annular groove 14 with its outer side extending beyond the tread surface thereof, to form a tread portion which holds the rubber heel spaced from the side wall, ground or the like. The rubber heel 12$^a$, with the annular suction element 12' secured thereto, as shown, is now placed in a suitable vulcanizing machine, by which means the same are vulcanized and form in effect an integral structure.

In the use of the device, suction element 12' extending outwardly beyond the tread portion of the heel, maintains the heel spaced from the side wall, ground or the like, thus taking the wear off of the same, while allowing the elastic action of the heel to come into place. The suction element 12' is formed of material which is much more durable than the rubber heel. The suction element 12' being in the form of a ring, provides a circular central opening, forming a suction chamber, which comes into action each time the heel is placed in engagement with the side wall or ground, thus tending to prevent the slipping of the same.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having described my invention, I claim:—

1. As an article of manufacture, a heel or sole comprising a plate of rubber provided with a substantially annular groove, a substantially annular suction element mounted within the substantially annular groove and extending outwardly beyond the tread surface of the plate or rubber, said suction element comprising a highly elastic core, and a plurality of layers of strong fabric wound about the same.

2. As an article of manufacture, a heel or sole comprising a section of relatively flexible material provided with a continuous inclosing groove extending through the outer tread surface thereof, a continuous inclosing suction element mounted within the surrounding groove and extending outwardly beyond the outer surface of said section to form therewith a suction chamber, the continuous inclosing suction element comprising a highly elastic core disposed within a protecting casing.

In testimony whereof I affix my signature in presence of two witnesses.

FRANK L. KRYDER.

Witnesses:
  E. W. SNYDER,
  G. C. WALTZ.